May 31, 1938.  H. A. HARTNER  2,119,162
SCREW PRESS
Filed March 2, 1936  2 Sheets-Sheet 2
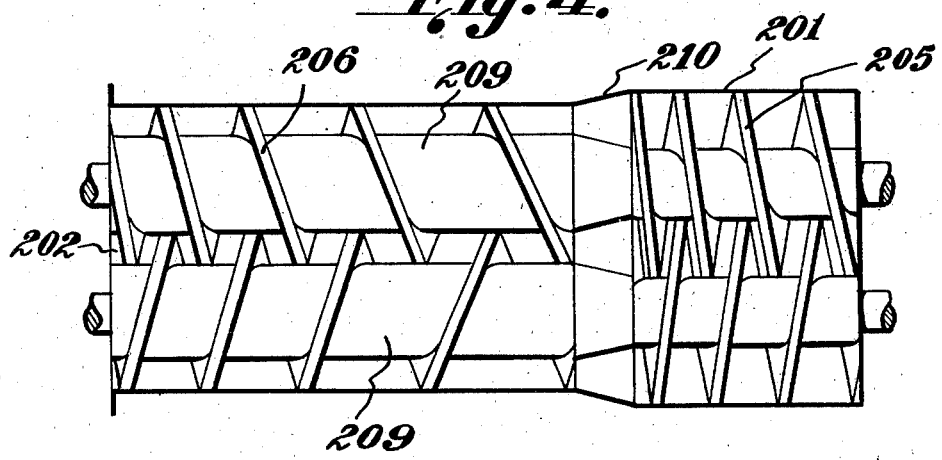
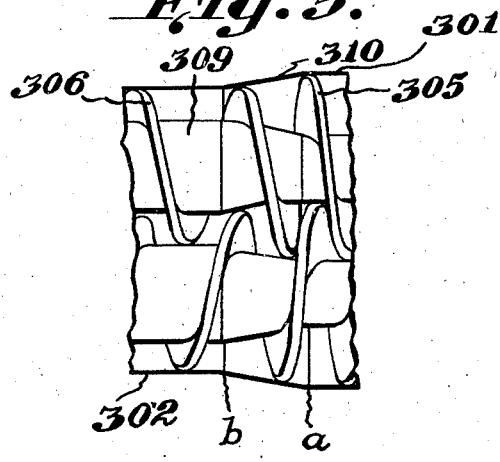
INVENTOR.
H. A. Hartner
BY
Glascock Downing Leebold
ATTORNEYS.

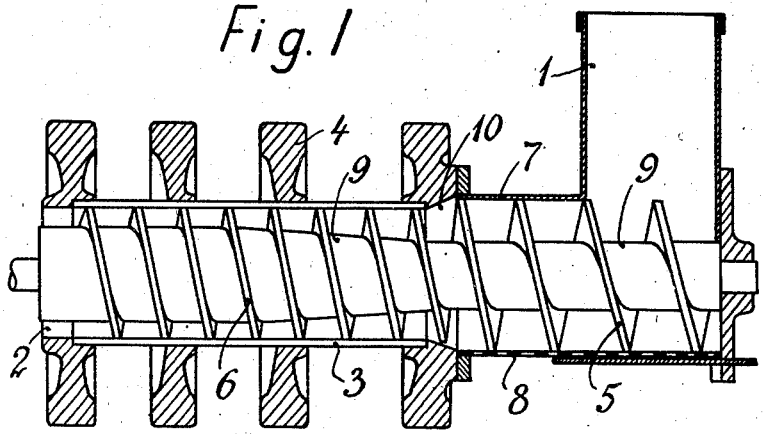
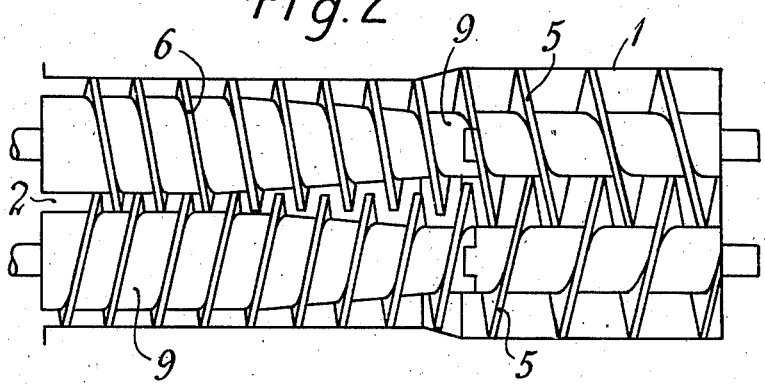
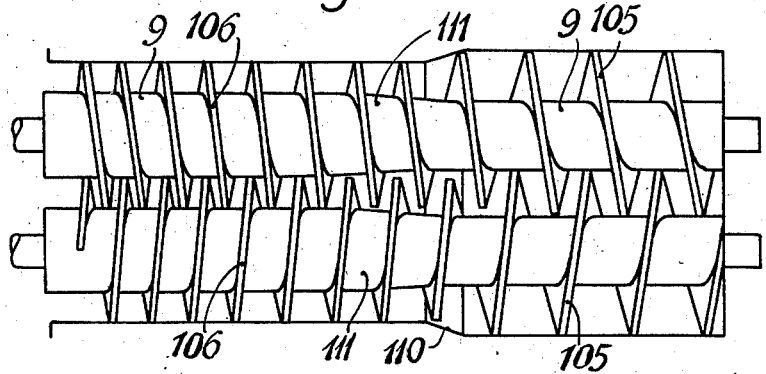

UNITED STATES PATENT OFFICE 2,119,162

SCREW PRESS

Hans Andreas Hartner, Oslo, Norway

Application March 2, 1936, Serial No. 66,767
In Norway March 5, 1935

8 Claims. (Cl. 100—48)

In known screw presses for pressing-out liquid from different kinds of masses the screw is made either with a core varying in diameter in relation to the external diameter of the threads from inlet towards outlet, or the pitch may decrease gradually towards the outlet, the external diameter of the threads and also the diameter of the core being constant, or both measures being combined. In both cases a pressing action is obtained which corresponds to the volume of the space between the threads at both ends of the screw. This volume is termed "thread volume" in the following.

In screw presses of this kind, however, it is a well known inconvenience that the mass to be pressed in order to be liberated from liquid, is liable to follow around with the screw inside the perforated press casing, so that the material obstructs the screw press and stops its operation. In order to avoid this drawback, different measures have been used. The screw has been divided up into sections separated by a cylindrical portion against which knives or the like project inwards from outside, and the press has been made with two or more screws, the threads of which interengage, so that the engagement prevents the mass from following around with the screws.

The present invention relates to screw presses of the last-named kind. In the known presses, however, the engagement between the threads of two or more press screws arranged side by side is not equally perfect throughout the length of the screw. For instance, if both screws are made with a constant external thread diameter throughout the length and having a tapered core, a sufficient engagement between each pair of screws is obtained at the outlet portion of the press, but the engagement becomes worse nearer to the inlet portion, where the engagement may be so imperfect that the mass to a high degree follows around with the screw. However, a perfect and equally good engagement throughout the length of the screws may be obtained, if the screws are made with constant external and internal thread diameters, and provided with an inwardly cylindrical press casing and a cylindric screw core, but in order to bring about a pressing action, it is also necessary to make the screws with variable pitch, viz: with a pitch decreasing towards the outlet, because only then a gradually decreasing thread volume is obtained. However, this results in the pitch becoming excessively great at the inlet as compared with that at the outlet. Consequently the screw requires a great impractical length and the pressing action is bad at the inlet portion, because at that place the threads are at a too great distance from each other.

The present invention has for its purpose to provide a press in which the above mentioned drawback is avoided. Screws are herein being used consisting of at least two sections arranged one behind the other and provided with an intermediate tapered connecting portion, so constructed that two neighboring sections have a thread volume decreasing continuously towards the outlet and the section located next to the outlet of the press is made with a smaller external thread diameter at the inlet end than that of the other section at the outlet end, and that the tapered connecting portion of the shorter length operates with or without a continuous pressing action as a transition portion for the mass from the section with the greater diameter to that with the smaller diameter.

The tapered transition portion makes it possible to make the pitch of the screw section having the greatest diameter smaller than in the case the same external thread diameter be used throughout the length, because a greater thread volume corresponds to a greater external thread diameter for the same core diameter. In the press arrangement of the present application each screw section may have a constant external thread diameter throughout the length, an increasing or decreasing core diameter being combined with a pitch which is constant or decreasing towards the outlet on a greater or smaller portion of the section length.

The transition portion between any two succeeding portions need not be perforated, but may be unperforated. If perforations are desired, it will be suitable to arrange the holes in peripheral direction.

The invention is illustrated in several embodiments in the drawings, wherein Fig. 1 shows a vertical section through the press and Fig. 2 a plan view of Fig. 1 of both pressing screws, the surrounding press casing being only indicated by its internal outline. Figs. 3 and 4 show in similar manner as Fig. 2 modified embodiments of the screws. Fig. 5 shows a portion of the screws wherein the transition portion has threads with a constant thread volume throughout its axial length.

Reference character 1 indicates the inlet for the mass to be pressed and 2 the outlet. 3 is the pressing casing which may be made in the usual manner by longitudinal bars arranged with suitable intermediate spaces in peripheral direction. These bars are held fast by means of surrounding strong rings 4. In this case each of the two screws is composed of two sections, viz: an inlet section 5 and an outlet section 6. Section 5 is arranged in the inlet casing 7, which has a perforated member 8. The screw 5 is made with a constant external thread diameter and also with a constant diameter of the screw core 9. However, the pitch of the threads decreases from the inlet place just under the hopper I towards the outlet 2 as clearly seen from Fig. 1. The second screw section 6 is also made with a constant external thread diameter, but here the screw pitch is constant throughout the length, whereas the core 9 is made tapered having an increasing diameter towards the outlet 2, whereby a constantly decreasing thread volume towards the outlet is obtained.

The screw section 5 is also seen as being made with a greater external thread diameter than that of the section 6. The two sections are connected together by a transition portion 10 of a tapered shape. Between both sections the screw threads are shaped correspondingly. The dimensions may for instance be made in such a manner that the transition portion has throughout its length the same thread volume as the left hand end of the section 5 and the right hand end of the section 6, in which case obviously no pressing action will occur, but only a conveyance in the portion 10. Also it is not necessary to provide the screw at the part surrounded by the transition portion 10 with threads, as shown in Fig. 4, although this is of course most suitable.

From Fig. 2 it appears that the interengagement of the two screws located side by side is perfect at the outlet 2, but becomes constantly less perfect towards the transition portion 10, because the core diameter of the section 6 becomes smaller. This unfavorable condition, however, is eliminated at the portion 10, so that the engagement between the screw sections 5 in the inlet portion 7 is perfect.

From Fig. 4 it is evident that both screw sections 205 and 206 are made with a variable pitch. In order that the total screw length in this case be not too great, a tapered transition portion 210 is inserted in a similar manner as seen in the first embodiment. Without such a transition portion the pitch of the section 205 would be excessively great, so that the length of this section would be unproportional as compared with the length of the pressing section proper 206.

According to Fig. 3, the core diameter of the portion 111 at one side of the transition portion 110 is slightly tapered next to the outlet, whereby a less perfect engagement is obtained in the neighborhood of the transition portion, but simultaneously a very small length is obtained, particularly as regards the screw section 105.

Fig. 5 shows an example, wherein the transition portion 310 beginning at the transverse plane a and ending at the plane b has throughout its length the same thread volume as that of section 305 at plane a and that of section 306 at plane b. In this case the thread pitch is increasing from a to b.

It is obvious that, in case of specially long pressing screws, it is advantageous to divide the screws into more than two sections behind each other with several intermediate tapered transition portions similar to 10, whereby a very small total length of the pressing screws as compared with the pressing action is obtained.

The arrangement described above may obviously be utilized in screw presses having two or more screws. Usually it would be suitable to divide the screw along its length and, in accordance with the several sections, on the separated longitudinal portions, so that each section may be made separately with the dimensions and from the materials which are found to be best suitable as regards the prevailing pressing pressures and other conditions for the section in question. Thus, generally the screw section 5 in the inlet portion will be considerably less strained than the section 6, where the strongest pressing takes place. Therefore, it is suitable to make the screw section 5 of cast iron, whereas the section 6 is made of steel.

I claim:—

1. A screw press, comprising a press casing, two longitudinal screws so arranged rotatably side by side therein that their threads intermesh with each other, an inlet at one casing end and an outlet at the other one, each screw being made of at least two sections on the same axial line, each with a thread volume decreasing continuously towards the casing outlet, any section located next to the casing outlet having a smaller exterior thread diameter at its inlet end than its neighboring co-axial section has at its outlet end located next to the casing inlet of each pair of neighboring co-axial sections under consideration, said sections being joined together through an intermediate tapered transition portion of short axial length to conduct the mass from one screw section to the next screw section.

2. A screw press, comprising a press casing, a plurality of longitudinal screws arranged rotatably side by side therein so that their threads intermesh with each other, an inlet at one casing end and an outlet at the other one, each screw being made of at least two sections on the same axial line, each with a thread volume decreasing continuously towards the casing outlet, any section located next to the casing outlet having a smaller exterior thread diameter at its inlet end than its neighboring co-axial section has at its outlet end located next to the casing inlet of each pair of neighboring co-axial sections under consideration, said sections being joined together through an intermediate tapered transition portion of short axial length to conduct the mass from one screw section to the next screw section.

3. A screw press, comprising a press casing, two longitudinal screws so arranged rotatably side by side therein that their threads intermesh with each other, an inlet at one casing end and an outlet at the other one, each screw being made of at least two sections on the same axial line, each with a thread volume decreasing continuously towards the casing outlet, any section located next to the casing outlet having a smaller exterior thread diameter at its inlet end than its neighboring co-axial section has at its outlet end located next to the casing inlet of each pair of neighboring co-axial sections under consideration, said sections being joined together through an intermediate tapered transition portion of short axial length, provided with threads with a constant thread volume throughout its length to conduct the mass from one screw section to the next screw section.

4. A screw press, comprising a press casing, a plurality of longitudinal screws arranged rotatably side by side therein so that their threads intermesh with each other, an inlet at one casing end and an outlet at the other one, each screw being made of at least two sections on the same axial line, each with a thread volume decreasing continuously towards the casing outlet, any section located next to the casing outlet having a smaller exterior thread diameter at its inlet end than its neighboring co-axial section has at its outlet end located next to the casing inlet of each pair of neighboring co-axial sections under consideration, said sections being joined together through an intermediate tapered transition portion of short axial length, provided with threads with a constant thread volume throughout its length to conduct the mass from one section to the next screw section.

5. A screw press, comprising a press casing, two longitudinal screws so arranged rotatably side by side therein that their threads intermesh with each other, an inlet at one casing end and an outlet at the other end, each screw being made of at least two co-axial sections on the same axial line, each with a constant exterior thread diameter throughout the length of the section and with a thread volume decreasing continuously towards the casing outlet, any section located next to the casing outlet having a smaller exterior thread diameter at its inlet end than that of its neighboring co-axial section located next to the casing inlet at its outlet end, each pair of neighboring co-axial screw sections under consideration being joined together through an intermediate tapered transition portion of short axial length to conduct the mass from one screw section to the next screw section.

6. A screw press, comprising a press casing, a plurality of longitudinal screws arranged rotatably side by side therein so that their threads intermesh with each other, an inlet at one casing end and an outlet at the other end, each screw being made of at least two co-axial sections on the same axial line, each with a constant exterior thread diameter throughout the length of the section and with a thread volume decreasing continuously towards the casing outlet, any section located next to the casing outlet having a smaller exterior thread diameter at its inlet end than that of its neighboring co-axial section located next to the casing inlet at its outlet end, each pair of neighboring co-axial screw sections under consideration being joined together through an intermediate tapered transition portion of short axial length to conduct the mass from one screw section to the next screw section.

7. A screw press, comprising a press casing, two longitudinal screws so arranged rotatably therein side by side that their threads intermesh with each other, an inlet at one casing end and an outlet at the other end, each screw being made of at least two co-axial sections on the same axial line, each with a constant exterior thread diameter throughout the length of the section and with a thread volume decreasing continuously towards the casing outlet, any section located next to the casing outlet having a smaller exterior thread diameter at its inlet end than that of its neighboring co-axial section located next to the casing inlet at its outlet end, each pair of neighboring co-axial sections under consideration being joined together through an intermediate tapered transition portion of short axial length provided with threads with a constant thread volume throughout its length to conduct the mass from one screw section to the next screw section.

8. A screw press, comprising a press casing, a plurality of longitudinal screws arranged rotatably therein side by side so that their threads intermesh with each other, an inlet at one casing end and an outlet at the other end, each screw being made of at least two co-axial sections on the same axial line, each with a constant exterior thread diameter throughout the length of the section and with a thread volume decreasing continuously towards the casing outlet, any section located next to the casing outlet having a smaller exterior thread diameter at its inlet end than that of its neighboring co-axial section located next to the casing inlet at its outlet end, each pair of neighboring co-axial sections under consideration being joined together through an intermediate tapered transition portion of short axial length, provided with threads with a constant thread volume throughout its length to conduct the mass from one screw section to the next screw section.

HANS ANDREAS HARTNER.